UNITED STATES PATENT OFFICE.

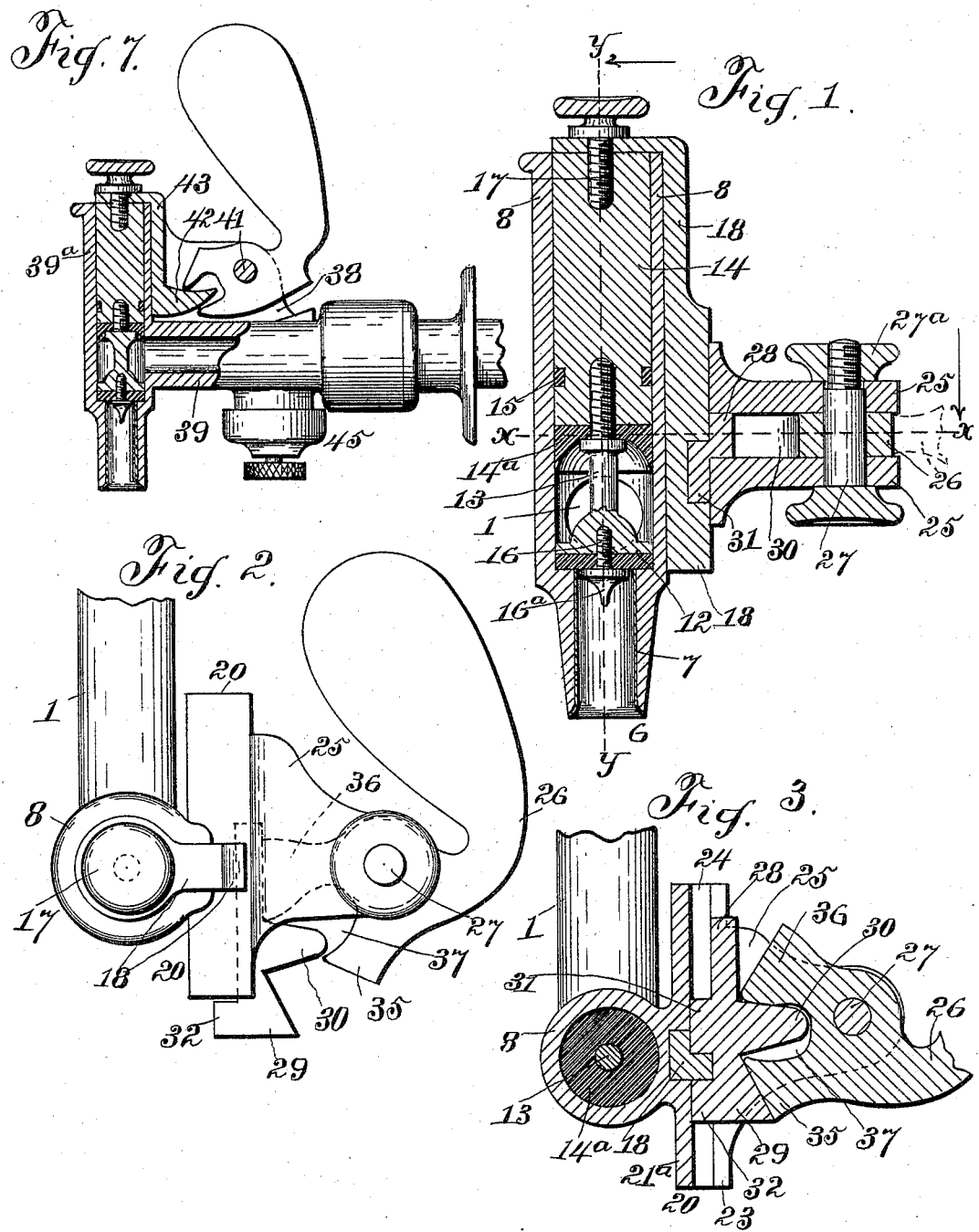

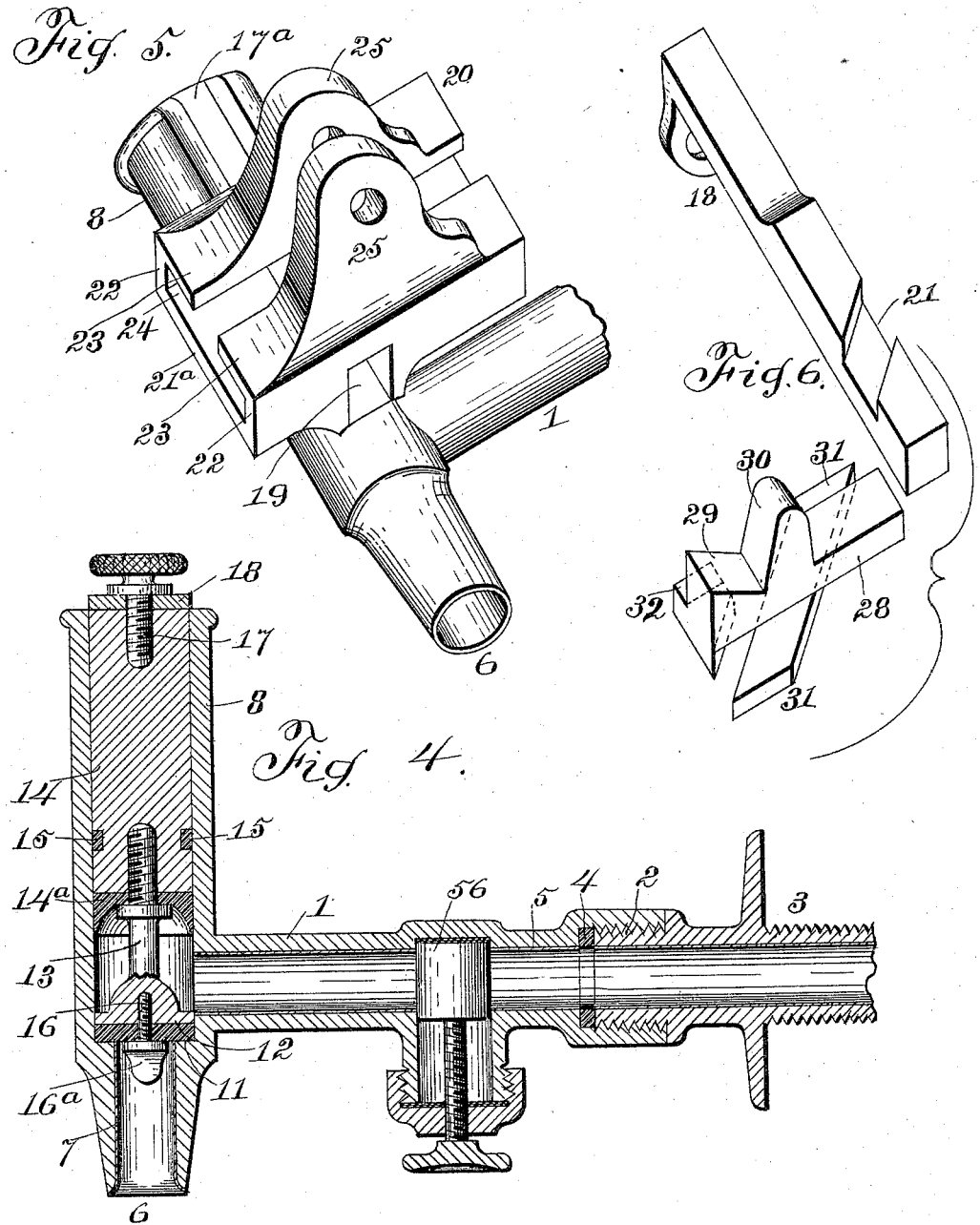

ALEXANDER HURST, OF READING, PENNSYLVANIA.

FAUCET.

SPECIFICATION forming part of Letters Patent No. 582,062, dated May 4, 1897.

Application filed June 19, 1896. Serial No. 596,155. (No model.)

*To all whom it may concern:*

Be it known that I, ALEXANDER HURST, a citizen of the United States, residing at Reading, in the county of Berks and State of Pennsylvania, have invented certain new and useful Improvements in Faucets, of which the following is a specification.

This invention relates to cocks and faucets, and particularly to a faucet-piston and means for operating the same.

The object of the invention is to provide an improved faucet-piston and a valve detachably connected with the piston at one end, and the other end of the piston having an angle-arm engaged by a hand-lever to operate said piston and valve.

A further object of the invention is to provide a new and novel mechanism operated by a hand-lever to impart motion to the piston.

A still further object of the invention is to provide a balance-valve mechanism and means connecting it with a hand-lever and the latter to the faucet whereby the parts may be removed and replaced while the faucet is closed without the use of wrenches, a screw-driver, or other implements or tools.

Other objects and advantages accruing from the improved construction and combination of parts will be hereinafter disclosed in the specification to follow.

The invention consists in the novel construction and arrangement of parts and resides, essentially, in the special means for operating the faucet-piston.

In the accompanying drawings, forming part of this application, Figure 1 is a central vertical section of my improved faucet closed. Fig. 2 is a top view of the faucet open. Fig. 3 is a cross-section on the line $x\,x$, Fig. 1. Fig. 4 is a section on the line $y\,y$, Fig. 1. Fig. 5 is a perspective view of the body of the faucet with the hand-lever, piston, and operating mechanism removed. Fig. 6 is a perspective view of the piston-operating mechanism with parts separated. Fig. 7 shows a modification partly in section.

The same numeral references denote the same parts throughout the several figures of the drawings.

The faucet-stem 1 has a screw-threaded end 2 for the ordinary coupling or connection 3 to a vessel, and between said parts 2 and 3 is located a gum packing or gasket 4. This stem 1, as well as the connection 3, has a block-tin lining 5, and the nozzle 6 is provided with a like lining 7. Formed integral with the nozzle and standing in a vertical line with the same is a cylinder 8, which communicates with the stem and nozzle openings, the latter having a seat 11 for the valve 12, having a screw-thread stem 13 engaging a piston 14, with a cup-washer $14^{a}$. An intervening piston-packing 15, and a set-screw 16, having a flat head $16^{a}$, is provided to removably secure the valve 12 to the valve-stem and is operated without wrench or tool. This piston and valve connection constitute my improved balanced valve.

To the upper end of the piston 14 is removably secured by a thumb-bolt 17 an angle-arm 18, which extends down the side of the cylinder 8 in a groove $17^{a}$ through a slot 19 in housing 20 upon the cylinder 8. This angle-arm or piston-lift 18 has a groove 21 extending diagonally across its face.

The cross-housing 20 is preferably formed integral with the faucet-cylinder 8, though it may be a separate piece and attached by suitable means. It comprises a solid back $21^{a}$, having angular flanges 22 and 23, forming an opening 24 between said flanges and the back $21^{a}$. The flanges 23 have projecting wings 25, to which a hand-lever 26 is pivoted upon a mill-headed bolt 27, provided with a thumb-nut $27^{a}$.

The mechanism to impart motion from the hand-lever to the piston constitutes, in addition to the above-described angular lift-arm, a bar 28, fitting between the edges of the flanges 23. It has an enlarged V-shaped end 29, a projection 30 from its front face, and a diagonal tongue 31 upon its rear face, and upon such face opposite the said V-head is a lateral extension or lug 32. The projection 30 stands in the opening between the wings 25, and the V-head 29 is also operated in this opening, while the tongue 31 and the lug 32 are slidably held in the opening 24 by the flanges 22 and 23. It will be observed that the slot 19 crosses the opening 24 and allows the face of the groove 21 to come flush with the opening 24, so that the said groove 21 receives the tongue 31 and connects the operating mechanism with the piston.

The hand-lever 26 is pivoted to and between the wings 25, and has forks 35 and 36 with an intervening space 37, which is engaged by the projection 30, and as the lever is moved back and forth upon its pivot the forks will carry said projection back and forth and the tongue 31 through the groove 21 to raise and lower the lift-arm 18 and the piston and open and close the faucet, as desired. The fork 35 has a beveled face which engages the V-head 29 to prevent jar or plunging of the parts in closing the piston, and the fork 36 has a similar beveled face to prevent a like action in opening the faucet. It will be observed from the peculiar arrangement and connection of this operating mechanism between the piston and the hand-lever that the least movement of the latter in either direction will be imparted to the piston without the least lost motion and insuring at all times a perfect valve-controlled mechanism.

Referring to the modification shown in Fig. 7, the cross-housing hereinbefore referred to and its contained elements are dispensed with and in lieu thereof flanges 38 are cast upon the faucet-stem 39 and a cylinder $39^a$. The hand-lever hereinbefore described is pivoted at 41 and its forks engage a curved tooth 42 upon the piston-lift 43. The beveled faces of the forks perform the same function in the operation of the piston as hereinbefore described. The cut-off or stop-plug 45 in this modification and 56 in the preferred form of faucet being covered by Letters Patent already issued to me, the same will not be here treated.

It will be observed that the piston in both forms of faucet can be readily removed by simply detaching the lift-arm without disturbing any other part of the faucet, and from the construction and connection between the piston and its valve-stem they may be easily separated for the purpose of renewing the valve and piston packing without a wrench or other tool.

It is obvious that the manner of connecting the parts may be varied as found most convenient in the manufacture of the faucet, and I therefore do not wish to be understood as limiting myself in this respect, nor to making the faucet in any particular number of parts, to the material of which such parts are composed, nor to the manner of making the parts, as the same may be varied in accordance with the best results attainable without departing from the spirit of my invention.

Having thus described my invention, what I claim as new, and desire to secure by Letters Patent, is—

1. The combination with a faucet having a piston, a pivoted forked hand-lever, of means to impart motion from the lever to the piston, comprising the piston lift-arm having a groove, a tongue operated in said groove, and a projection engaged by the forks, as set forth.

2. The combination with a faucet having a piston, a piston lift-arm having a diagonal groove, and a forked hand-lever, of a cross-housing, and a bar operated in the housing by said lever, and having a tongue engaging the said groove to impart motion to the lift-arm, as set forth.

3. The combination with a faucet having a piston, a diagonally-grooved piston lift-arm, a cross-housing, and a forked lever, of means contained in the housing to impart motion from the lever to the lift-arm, comprising a bar having a projection engaged by the lever-forks, and a diagonal tongue operated in the said groove, substantially as set forth.

In witness whereof I hereunto set my hand in the presence of two witnesses.

ALEXANDER HURST.

Witnesses:
ISAIAH KLINE,
WM. F. WEBER.